April 17, 1973    F. H. HART ET AL    3,728,096
METHOD AND APPARATUS FOR ELECTRICALLY-WELDING
A DOUBLE WALLED GLAZING UNIT
Filed Oct. 16, 1970    2 Sheets-Sheet 1
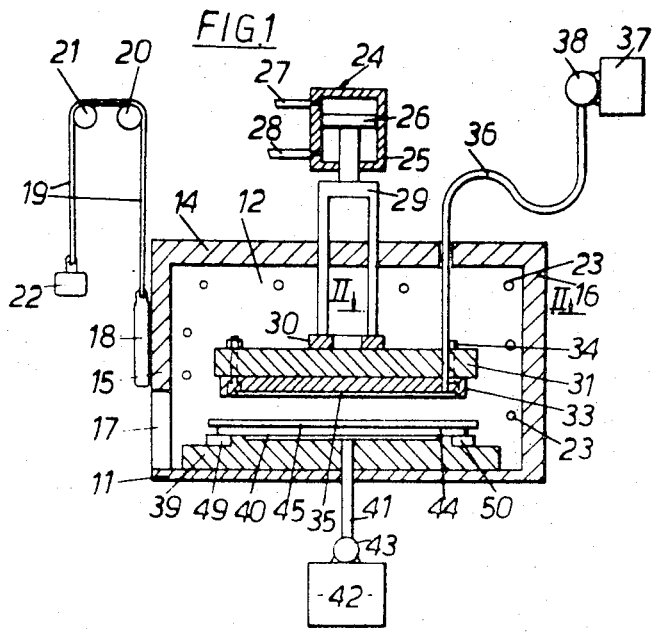
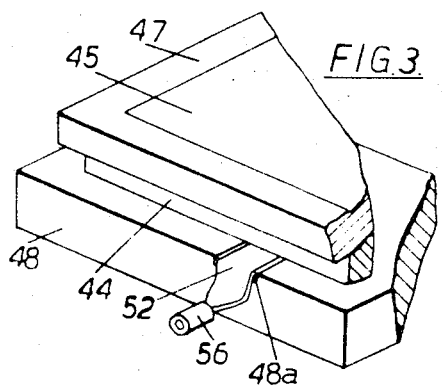
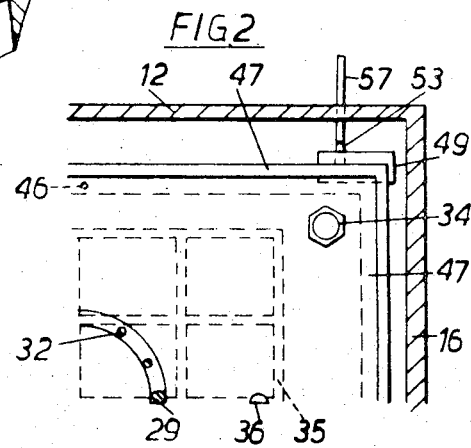

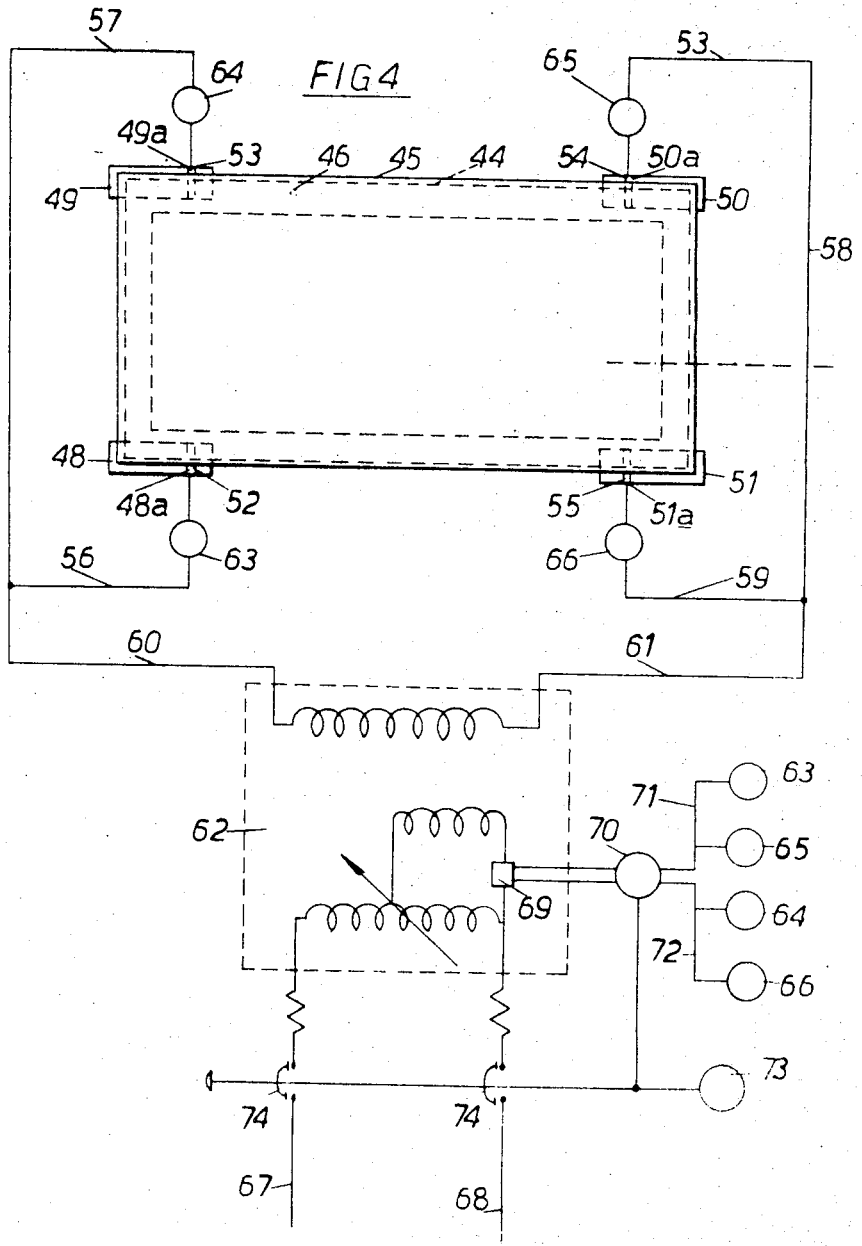

United States Patent Office 3,728,096
Patented Apr. 17, 1973

3,728,096
METHOD AND APPARATUS FOR ELECTRICALLY WELDING A DOUBLE WALLED GLAZING UNIT

Frederick Harry Hart, Bolton, and William McFegan, St. Helens, England, assignors to Pilkington Brothers Limited, Liverpool, Lancashire, England
Filed Oct. 16, 1970, Ser. No. 81,340
Claims priority, application Great Britain, Oct. 17, 1969, 51,231/69
Int. Cl. C03b 23/20
U.S. Cl. 65—40                               11 Claims

ABSTRACT OF THE DISCLOSURE

A glass article, e.g. an all-glass multiple glazing unit, is manufactured by uniting at least two glass parts by a continuous weld. The regions of the glass parts to be united are heated to soften the regions and to form the desired weld. This step of heating the region is performed by passing electrical heating currents through said region along two different paths of substantially equal resistance.

BACKGROUND OF THE INVENTION (1) Field of the invention

The present invention relates to the manufacture of glass articles by uniting an assembly of glass parts united by a continuous weld, and has particular application to the manufacture of all-glass multiple glazing units.

(2) Prior art

It is well known to manufacture a glass article by uniting two or more glass parts with a continuous weld and in the manufacture of all-glass multiple glazing units, the margins of an assembly of glass sheets are united by a continuous peripheral weld and the unwelded areas of the sheets, i.e. bounded by the continuous weld, are pulled apart whilst the welded periphery is soft to establish a desired spacing between the unwelded areas of the sheets.

In practicing the peripheral welding of glass sheets for the manufacture of all-glass multiple glazing units, glass sheets are washed, dried, preheated and assembled at a welding station one above the other and with their peripheries adjacent. Electrical heating currents are passed through an electrically conductive stripe deposited on one of the glass sheets, generally on the top surface of the top glass sheet and forming a continuous electrical path adjacent the periphery of said sheet, and the flow of electrical heating currents through the stripe causes said stripe to be heated. The margins of the sheet underlying the stripe are heated by conduction from the stripe until the stripe attains a temperature at which it burns off and at this stage the glass underlying the stripe has attained a temperature at which said glass is conductive to the electrical heating currents so that said heating currents now flow through the margins of heated glass.

The margins of the underlying sheet or sheets are heated by their close association with the heated margins of the top sheet and as the heating of the margins of the top sheet continues, heat transfer through the glass causes the margins of the sheets to soften and to be united by a peripheral weld.

SUMMARY

According to the present invention a method of manufacturing a glass article by uniting an assembly of glass parts by a continuous weld comprises heating the regions of the glass parts to be united to soften said regions and to form a continuous weld uniting the parts, the heating of said region of at least one of the glass parts being performed by passing electrical heating currents through said region along two different paths of substantially equal resistance.

The invention has particular application to the manufacture of all-glass multiple glazing units and according to this aspect of the present invention a method of manufacturing an all-glass multiple glazing unit by uniting an assembly of glass sheets by a continuous peripheral weld comprises heating the margins of the glass sheets to soften said margins and to form a peripheral weld uniting the sheets, the heating of the margins of at least one of the glass sheets being performed by passing electrical heating currents through said margins along two different paths of substantially equal resistance.

Preferably two or more pairs of different paths of substantially equal resistance are provided and preferably the electrical heating currents are applied successively to each pair of paths in turn.

The present invention also envisages apparatus for manufacturing a glass article by uniting an assembly of glass parts by a continuous weld, comprising means for supporting the glass parts in desired relation, at least one pair of electrodes to heat the regions of the glass parts to be united to soften said regions and to form a continuous weld uniting the parts and an electrical circuit arrangement for applying a potential between the electrodes so that electrical heating currents are caused to pass through said region of at least one of the glass parts along two different paths of substantially equal resistance.

The invention further envisages apparatus for manufacturing an all-glass multiple glazing unit by uniting an assembly of glass sheets by a continuous peripheral weld, comprising means for supporting the assembly of glass sheets, at least one pair of electrodes to heat the margins of the glass sheets to soften said margins and to form a peripheral weld uniting the sheets, and an electrical circuit arrangement for applying a potential between the pair of electrodes so that electrical heating currents are caused to pass through said margins of at least one of the sheets along two different paths of substantially equal resistance.

Preferably the electrodes of the or each pair are spaced apart along said regions or margins to be softened, the distance between the electrodes being such that the two different paths therebetween for the passage of electrical heating currents are of substantially equal resistance.

With the above arrangement simultaneous welding of the whole of the margins of an assembly of glass sheets has been obtained.

BRIEF DESCRIPTION OF THE DRAWINGS

FIG. 1 is a vertical section through a welding chamber, by way of example, for the manufacture of all-glass multiple glazing units;

FIG. 2 is a section along the line II—II of FIG. 1;

FIG. 3 is a perspective view of one corner region of an assembly of glass sheets to be united in the welding chamber shown in FIG. 1, and the associated electrode; and FIG. 4 is an electrical circuit arrangement for the electrodes of the welding chamber shown in FIG. 1.

DESCRIPTION OF THE PREFERRED EMBODIMENT

With reference to FIG. 1, there is shown a welding chamber for the manufacture of all-glass welded multiple glazing units. The welded chamber is defined by a floor 11, side walls 12, of which only the far wall is shown, a roof 14, and end walls 15 and 16. End wall 15 extends downwardly from the roof 15 but terminates short of the floor 11 to leave an opening 17 through which an assembly of glass sheets can be inserted into the welding chamber and welded units removed from the welding chamber. The opening 17 can be closed by a door 18 suspended by a cable 19 which passes over pulley wheels 20 and 21 and is connected to a counter weight 22. Radiant heaters 23 are disposed within the welding chamber to maintain the mechanical parts and atmosphere within the welding chamber at their operational temperatures.

Above the welding chamber there is mounted a double-acting jack 24 comprising a cylinder 25, a piston 26 and conduits 27 and 28 for conducting hydraulic fluid to the piston. Piston 26 supports a yoke 29 the arms of which pass down through openings in the roof 14 of the welding chamber and support a ring 30 to which a chuck piston 31 is secured by screws 32 (see FIG. 2). An upper sheet holding platen 33 is secured to the underside of the platen 31 by bolts 34 arranged near each corner of the assembled platens 31, 33 and the lower ends of the bolts 34 are contained in counterbored recesses in the platen 33 so that the platen 33 presents a substantially flat undersurface.

The sheet holding platen 33 has a lattice arrangement of recesses 35 in its undersurface connectable by way of a conduit 36 to a low pressure source, defined generally by reference numeral 37. A valve 38 is provided for connecting the conduit 36 to the low pressure source 37 or to atmosphere as required in accordance with the welding sequence described hereinafter.

Below the upper sheet holding platen 33 there is a fixed lower sheet holding platen 39 having a lattice arrangement of recesses 40 in its upper surface. The recesses 40 are connectable by way of a conduit 41 to a low pressure source 42 and a valve 43 is provided for connecting the conduit 41 to the source 42 or to atmosphere as required.

The welding chamber described above is prepared for a welding operation when piston 26 and the depending assembly 29, 31 and 33 are in an elevated position, valves 38 and 43 are porting their respective conduits 26 and 41 to atmosphere, and the door 18 is elevated to allow an assembly of two glass sheets 44 and 45 to be introduced into the welding chamber.

The lower sheet 44 has a pore hole 46 drilled near one edge and the sheet is washed, dried and preheated to a temperature of 480° C. The lower sheet 44 rests on the upper surface of the lower sheet holding platen 39, has a length and width greater than that of said upper surface, and is arranged so as to overlap said upper surface equally on all sides.

The upper glass sheet 45 has a length ¼ in. greater than the lower sheet 44 and a width ¼ in. greater than sheet 44 and said upper sheet 45 is prepared for welding when said sheet is washed, dried, has an electrically conductive stripe 47 e.g. of colloidal graphite, painted on the peripheral marginal region of its top surface, is preheated to a temperature of 480° C., and rests on sheet 44 so as to overhand sheet 44 equally on all sides.

The valve 43 is then actuated to connect the recesses 40 in the upper surface of the lower sheet holding platen with the low pressure source 42 so that the lower sheet 44 is held by suction on to the platen 39. Hydraulic fluid is caused to flow through the conduits 27 and 28 of the jack 24 to lower the piston 26 and the depending assembly 29, 31, 33 until the upper sheet holding platen 33 contacts the top surfaces of the upper sheet 45 and at this point the valve 38 is actuated to connect the recesses 35 in the platen 33 with the low pressure source 37 so that the upper sheet 45 is held to the platen 33 by suction.

The hydraulic fluid supply through the conduits 27 and 28 is then reversed to lift the piston 26 and the dependent assembly 29, 31, 33 with the upper sheet 45 until the sheet 45 is spaced a small distance, e.g. between 1/16 in. and 1/8 in., over the lower sheet 44.

Electrical heating currents are then applied to the electrically conductive stripe 47 on the upper sheet 45 and subsequently to the softened margins of the sheet 45, in the manner to be described in detail hereinafter, to cause the marginal regions of the sheet 45 to soften, sag down into contact with the marginal regions of the lower sheet 44, and to unite with the sheet 44 to form a continuous peripheral weld uniting the sheets 44 and 45.

When the weld has been completed, the jack 24 is operated to elevate the piston 26 and the dependent assembly 29, 31, and 33. The central region of the upper sheet 45, being held by suction to the platen 33, is thereby pulled away from the unwelded central region of the lower sheet 44, and air flows into the space between the sheets through the pore hole 46. As the central regions of the sheets 44 and 45 are pulled apart, the welded periphery is pulled into the form of a wall extending between the central regions. The elevation of the central region of the upper sheet 45 is continued until the desired spacing, e.g. ¼ in., is obtained between the sheets 44 and 45.

At this stage elevation of the depending assembly 29, 31, 33 is terminated and the mechanical parts hold their positions until the peripheral weld has lost sufficient heat as to be self-supporting. Valve 38 can then be actuated to disconnect the conduit 36 from the low pressure source 37 and to connect the conduit 36 to atmosphere, whereby the platen 33 releases its suction hold on the top surface of the welded assembly, and the jack 24 again operated to elevate the depending assembly 29, 31, 33 until the platen 33 is well clear of the welded assembly. Valve 43 is then actuated to disconnect the conduit 41 from the low pressure source 42 and to connect the conduit 41 to atmosphere so that the welded assembly is no longer held by suction against the platen 39. The door 18 can be elevated to allow removal of the welded assembly from the welding chamber for further processing i.e. annealing.

An electric circuit for heating the marginal regions of the glass sheets 44, 45 is illustrated in FIG. 4 and will now be described.

The four corner regions of the lower sheet 44 rest on and are supported by four blocks 48, 49, 50 and 51 each of which has a slot 48a, 49a, 50a and 51a respectively cut in its upper surface to house strip electrodes 52, 53, 54 and 55 respectively. The vertical thickness of each electrode 52, 53, 54 and 55 in its respective slot is less than the depth of the slot so that electrodes 52, 53, 54 and 55 lie below and do not make contact with the undersurface of sheet 44.

Electrodes 52, 53, 54 and 55 are connected by leads 56, 57, 58 and 59 respectively to output leads 60 and 61 of a transformer 62, leads 56 and 57 being connected to output lead 60 and leads 58 and 59 being connected to output lead 61. The leads 56, 57, 58 and 59 include switches 63, 64, 65 and 66 respectively.

The transformer 62 receives main current at 415 volts, 50 cycles/second on input leads 67 and 68 and converts the current to a maximum output of 25,000 volts, 50 cycles/second on leads 60, 61.

A current sensing device 69, sensitive to current flow through the transformer 62, is linked with a current limit switch 70 which switches each time device 69 detects a predetermined level of current flow in transformer 62.

The current limit switch 70 has two leads 71, 72 extending therefrom, lead 71 communicating with switches 63 and 65 and lead 72 communicating with switches 64 and 66 so that, in one switched position the switch 70, signals on leads 71 and 72 open switches 63 and 65 and close switches 64 and 66, whilst, in the other switched position of switch 70, signals on leads 71 and 72 close switches 63 and 65 and open switches 64 and 66. Switch 70 also transmits a signal indicative of its switched position to a timing device 73 arranged to operate when the rate of switching of the switch 70 reaches a predetermined level and when operated device 73 opens a control switch 74 in leads 67, 68 to terminate the main current supply to the transformer 62.

The heating apparatus described above operates as follows:

With preheated glass sheets 44 and 45 supported by their respective platens 39 and 33 and spaced apart by a small distance, e.g. between 1/16 in. and 1/8 in., the welding operation is started by closing switch 74 to supply means current to the transformer 62.

With main current flowing through the transformer 62, electrical heating currents flow in the output circuit of the transformer 62 across the glass sheet 45 dependent upon the switched position of switch 70. Thus, if the switch 70 is initially in a position where the switches 63 and 65 are closed and the switches 64 and 66 are open, current will flow between the electrodes 52 and 54 by way of the electrically conductive stripe 47, the current flowing by two paths one of which extends from the electrode 52 to the electrode 54 by-passing the disconnected electrode 53, and the other path extending from the electrode 52 to the electrode 54 by-passing the electrode 55. The two paths together thus conduct heating current simultaneously to all the margins of the sheet 45 and the margins of the sheet 45 are heated thereby.

As the flow of current through the electrically conductive stripe 47 causes said stripe 47 and the underlying glass to be heated, the resistance of the electrically conductive path falls and current flow increases until the level of current flow through the transformer 62, detected by the device 69, attains a level to cause the current limit switch 70 to switch to its alternative position.

In the alternative position, the switches 63 and 65 are opened and the switches 64 and 66 are closed so that current now flows between the electrodes 53 and 55 by two paths one of which by-passes the electrode 54 and the other by-passing the electrode 52. Once again current flows to all the margins of the sheets 45 and the margins of the sheets 45 are heated thereby.

As the margins of the sheet 45 are heated, the resistance is continuously falling so that the rate of switching of the switch 70 increases until it reaches a predetermined level when the switch 73 operates to terminate the welding operation by opening the switch 74 to disconnect mains supply to the transformer 62. It will be appreciated that at the predetermined rate of switching of the switch 70, the resistance of the glass will correspond to a heat input to the margins of the sheets 44, 45 sufficient to form a peripheral weld.

Considering now the mechanics of the system and considering the manufacture of a double glazing unit to have a final length of approximately 36 in. and a width of 12 in., the lower sheet 44 will have a length of 36 in. and a width of 12 in. approximately and the upper sheet 45 will have a length of approximately 36 1/4 in. and a width of 12 1/4 in. approximately.

In conventional systems current is supplied to the actual corner regions of the assembled sheets 44 and 45. If this was done in the present system, each electrically conductive path would initially comprise one long side and one short side of the sheets. Also, any difference in the resistance of the two initial paths would result in the current flow being different for the two paths and at the first switch to the second pair of paths one of the original paths would be colder than the other.

Thus at the first switch, one of the second pair of paths would comprise the long hot side of one of the original paths plus the short cold side of the other original path and the other second path would comprise the long cold side of the original pair of paths plus the short hot side of the original paths.

With a length to width ratio of 3:1, the path in the second pair of paths having the long cold side thereon would have a much higher resistance than the other path and in the second heating pulse the difference in resistance between the two paths would increase. The system would result in one long side being always colder than the other three sides and a uniform welding of the periphery of the assembled sheets would be impossible to obtain.

In the method proposed by the present invention the electrodes are so disposed relative to the periphery of the glass that the system is electrically square. In this example, for a double glazing unit of 36 in. by 12 in. the total peripheral length of the lower sheet and of the finished assembly is 96 in. and the four electrodes 52, 53, 54 and 55 are equally spaced about the periphery of the lower sheet 44 so that the spacing between adjacent electrodes measured along the periphery is 24 in. In this example each electrode is located approximately 6 in. from the adjacent short end of the lower sheet 44.

With this arrangement the two paths between co-operating electrodes 52, 54 are equal in length and when current is switched to the other two-co-operating electrodes 53, 55 each of the new paths is made up of exactly one half of each of the first pair of paths. Thus, if at the end of a heating pulse one path has a resistance greater than the other path then at the next switch the two new paths each comprise one half of the high resistance path and one half of the low resistance path so that the resistance of the two new paths is substantially equal.

In the above described arrangement the electrodes are described as equally spaced physically about the periphery of the sheet 44 and when the glass has a uniform temperature and thereby affords a substantially uniform resistance along its periphery the electrodes are electrically spaced to afford equal resistance between adjacent electrodes i.e. the arrangement is electrically square.

When the glass sheet is not uniformly heated the electrodes are so located relative to the glass as to be electrically square.

Thus, in plant for successively welding double glazing units it often happens that successive glass sheets are delivered to the welding unit with a common heating fault i.e. with the short ends colder than the long ends. In this case the actual distance between the electrodes 53 and 54 and between the electrodes 52 and 55 can be increased, thereby reducing the physical spacing between the electrodes 52 and 53, and between the electrodes 54 and 53. With plant for successively producing double glazing units, faults in heating are usually found in successive sheets so that the electrodes do not require individual adjustment for each pair of sheets delivered to the welding chamber but if the faults are not common in successive sheets individual adjustment of the electrodes may be necessary.

It has been found in practice that slight differences in the electrical resistance of the path between adjacent electrodes are not detrimental to the welding operation and often wide differences in the resistances of the two original paths are not detrimental to the welding operation if the resistance along each path is substantially uniform because the difference in resistance is eliminated when the heating currents are switched to the two new paths.

The electrical heating currents applied to the glass can be applied as pulses with automatic switching when the current flow attains a predetermined value as described with reference to FIG. 4, or alternatively the pulses can be controlled by a timing device so as to apply pulses of equal time duration alternately to the two co-operating pairs of electrodes.

Although this example is described as having "switches" for determining the operation or non-operational conditions of the electrodes, it will be understood that any form of electrical device or circuit arrangement which can permit each pair of co-operating electrodes to be conducting when the other two electrodes are non-conducting may be used.

Thus in a modification of this example, the switches 63, 64, 65 and 66 may comprise diode stacks so arranged that when the alternating current is flowing in the transformer output circuit and the lead 60 is at a positive potential, current flow is across the glass between electrodes 52 and 54, whilst with a negative potential at lead 60 the current flow is across the glass between electrodes 53 and 55.

With this arrangement, if we consider each oscillation of the current as including a positive pulse and a negative pulse, the positive pulses are applied across one pair of co-operating electrodes and the negative pulse is applied across the other pair of co-operating electrodes. The result is a switching rate between the co-operating pairs of electrodes equal to 100 switches/second.

The heating currents applied to the whole of the periphery of the glass are not necessarily applied continuously to the glass during the whole of the welding operation and it is sometimes advantageous to have at least one "dwell" period during the operation when no electrical heating current flows.

We claim:

1. A method of manufacturing an all glass electrically welded double glazing unit, which method comprises superposing two flat glass sheets of generally rectangular form, holding one sheet spaced above the other and electrically heating the marginal regions of the sheets to form a continuous weld uniting the marginal regions of the two sheets, said electrical heating being effected by passing electrical heating currents through the marginal regions of the glass sheets by use of a first pair of electrodes and a second pair of electrodes, the first and second pairs being spaced apart from each other around the periphery of the sheets to form overlapping current paths and the two electrodes of each pair being diagonally opposite each other to provide two equidistant peripheral current paths between them, wherein the electrical welding current is successively passed through the first and second pairs of electrodes in turn.

2. A method according to claim 1, wherein the electrical heating currents are alternating currents, one half of each cycle being passed between one pair of electrodes and the other half of the cycle being passed between the other pair of electrodes.

3. A method according to claim 1 in which the welding current is repeatedly passed through both the first and the second pair of electrodes to complete the weld.

4. A method according to claim 1 in which the electrodes of each pair are located at opposite corner regions of the sheets.

5. A method according to claim 1 in which the magnitude of the current in a welding current supply circuit is sensed and used to control switching of the welding current from one pair of electrodes to the other pair of electrodes.

6. Apparatus for manufacturing an all glass electrically welded double glazing unit, which apparatus comprises a welding chamber, locating means within the chamber for holding in position a lower glass sheet of generally rectangular form, holding means within the chamber for holding an upper glass sheet in spaced relationship above the lower glass sheet and welding means for passing electrical heating currents through marginal regions of the sheets to weld the marginal regions of the sheets together, said welding means comprising a welding current supply circuit, a first pair of electrodes for supplying welding current to the sheets, a second pair of electrodes for supplying welding current to the sheets, the second pair being spaced from the first pair around the periphery of the sheet position to form overlapping current paths and the two electrodes of each pair being located at diagonally opposite parts of the sheet position to provide two equidistant peripheral current paths between them, and switch means for successively connecting the welding current supply circuit to the first and second pairs of electrodes in turn.

7. Apparatus according to claim 6, wherein the heating currents are alternating currents and the electrical circuit arrangement has means for passing one half of each cycle between one of the pairs of electrodes and the other half of the cycle between the other pair of electrodes.

8. Apparatus according to claim 6 in which the electrodes of each pair are located at opposite corner regions of the sheets.

9. Apparatus according to claim 6 in which each of the four electrodes is located mid-way between the two adjacent electrodes, whereby the current path length between adjacent electrodes is uniform.

10. Apparatus according to claim 6 in which the welding current supply circuit includes a current level detector connected to the said switch means whereby switching from one pair of electrodes to the other is controlled in dependence on the current level detected.

11. Apparatus according to claim 6 in which the electrodes of each pair are located out of contact with the glass sheets.

References Cited

UNITED STATES PATENTS 2,389,360   11/1945   Guyer et al. _____ 65—40

FOREIGN PATENTS 925,488   5/1963   Great Britain _____ 65—58

ARTHUR D. KELLOGG, Primary Examiner

U.S. Cl. X.R.

65—58, 156, 162